US011826991B2

(12) United States Patent
Takei et al.

(10) Patent No.: US 11,826,991 B2
(45) Date of Patent: *Nov. 28, 2023

(54) HOT-MELT ADHESIVE RESIN FILM AND PRODUCTION METHOD THEREOF

(71) Applicant: FUJIMORI KOGYO CO., LTD., Tokyo (JP)

(72) Inventors: Kunihiro Takei, Tokyo (JP); Yuiko Maruyama, Tokyo (JP); Hirokazu Iizuka, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 17/476,409

(22) Filed: Sep. 15, 2021

(65) Prior Publication Data
US 2022/0001655 A1 Jan. 6, 2022

Related U.S. Application Data

(63) Continuation of application No. 15/748,995, filed as application No. PCT/IB2016/001088 on Aug. 3, 2016, now Pat. No. 11,148,401.

(30) Foreign Application Priority Data

Aug. 6, 2015 (JP) ................................ 2015-156367

(51) Int. Cl.
| | |
|---|---|
| B32B 7/12 | (2006.01) |
| B32B 27/08 | (2006.01) |
| B32B 27/32 | (2006.01) |
| C09D 123/26 | (2006.01) |
| C09D 5/00 | (2006.01) |
| C09J 123/26 | (2006.01) |
| C09J 201/00 | (2006.01) |
| B32B 27/00 | (2006.01) |
| C09J 151/06 | (2006.01) |
| B32B 37/00 | (2006.01) |
| C09J 7/29 | (2018.01) |
| C09J 7/35 | (2018.01) |
| B32B 27/20 | (2006.01) |

(Continued)

(52) U.S. Cl.
CPC .............. *B32B 27/08* (2013.01); *B32B 27/00* (2013.01); *B32B 27/20* (2013.01); *B32B 27/302* (2013.01); *B32B 27/32* (2013.01); *B32B 27/325* (2013.01); *B32B 27/34* (2013.01); *B32B 27/36* (2013.01); *B32B 27/38* (2013.01); *B32B 37/00* (2013.01); *B32B 37/12* (2013.01); *B32B 37/185* (2013.01); *C09D 5/00* (2013.01); *C09D 123/26* (2013.01); *C09J 7/29* (2018.01); *C09J 7/35* (2018.01); *C09J 123/26* (2013.01); *C09J 151/06* (2013.01); *C09J 201/00* (2013.01); *B05D 5/10* (2013.01); *B32B 2250/03* (2013.01); *B32B 2250/24* (2013.01); *B32B 2250/40* (2013.01); *B32B 2255/10* (2013.01); *B32B 2255/26* (2013.01); *B32B 2270/00* (2013.01); *B32B 2307/306* (2013.01); *B32B 2307/732* (2013.01); *B32B 2323/10* (2013.01); *B32B 2325/00* (2013.01); *B32B 2363/00* (2013.01); *B32B 2367/00* (2013.01); *B32B 2377/00* (2013.01); *B32B 2405/00* (2013.01); *C09J 2301/124* (2020.08); *C09J 2301/304* (2020.08); *C09J 2301/414* (2020.08); *C09J 2423/00* (2013.01); *C09J 2423/006* (2013.01); *C09J 2423/106* (2013.01); *C09J 2451/00* (2013.01); *C09J 2463/00* (2013.01); *C09J 2467/006* (2013.01); *C09J 2479/08* (2013.01); *Y10T 428/287* (2015.01); *Y10T 428/2813* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 4,232,086 | A | 11/1980 | Mori et al. |
| 9,365,737 | B2 | 6/2016 | Hirota et al. |

(Continued)

FOREIGN PATENT DOCUMENTS

| | | | |
|---|---|---|---|
| JP | H0267386 | A | 3/1990 |
| JP | H04114072 | A | 4/1992 |

(Continued)

OTHER PUBLICATIONS

Akahisa, Inoue et al., "Multilayer Hot Melt Film and Laminate Thereof", English translation of JPH10138418A., May 26, 1998 (Year: 1998).*

(Continued)

*Primary Examiner* — Anish P Desai
(74) *Attorney, Agent, or Firm* — HAUPTMAN HAM, LLP

(57) ABSTRACT

The present invention relates to a hot-melt adhesive resin film having an excellent adhesive force and durability to various adherends such as metal, glass, and plastic, and a production method thereof. More particularly, the present invention relates to a hot-melt adhesive resin film including a first surface layer, a first intermediate layer, a substrate layer having heat resistance, a second intermediate layer, and a second surface layer, which are laminated in this order, in which the first intermediate layer and the second intermediate layer include a resin which is obtained by modifying a copolymer of propylene and 1-butene with maleic acid, and a production method thereof.

7 Claims, 1 Drawing Sheet

(51) Int. Cl.

| | |
|---|---|
| *B32B 27/30* | (2006.01) |
| *B32B 27/34* | (2006.01) |
| *B32B 27/36* | (2006.01) |
| *B32B 27/38* | (2006.01) |
| *B32B 37/12* | (2006.01) |
| *B32B 37/18* | (2006.01) |
| *B05D 5/10* | (2006.01) |

(56) References Cited

U.S. PATENT DOCUMENTS

| | | | |
|---|---|---|---|
| 9,556,352 B2 | 1/2017 | Yano et al. | |
| 10,077,383 B2 | 9/2018 | Takamori | |
| 11,148,401 B2 * | 10/2021 | Takei | B32B 27/302 |
| 11,359,117 B2 * | 6/2022 | Iizuka | C09J 7/20 |
| 2006/0199915 A1 | 9/2006 | Izumi et al. | |
| 2009/0068483 A1 | 3/2009 | Morikawa et al. | |
| 2009/0110861 A1 | 4/2009 | Sherman | |
| 2015/0087769 A1 | 3/2015 | Hirota et al. | |
| 2015/0315400 A1 | 11/2015 | Yano et al. | |
| 2016/0036013 A1 | 2/2016 | Nakazato et al. | |
| 2016/0046842 A1 | 2/2016 | Uematsu et al. | |
| 2016/0280828 A1 | 9/2016 | Kawabe et al. | |
| 2019/0001634 A1 | 1/2019 | Takei et al. | |
| 2021/0008854 A1 * | 1/2021 | Takei | C09J 7/29 |
| 2022/0049131 A1 * | 2/2022 | Takei | C09J 7/243 |

FOREIGN PATENT DOCUMENTS

| | | | | |
|---|---|---|---|---|
| JP | H04320469 | A | 11/1992 | |
| JP | H04363372 | A | 12/1992 | |
| JP | H10138418 | A | 5/1998 | |
| JP | 2011083895 | A | 4/2011 | |
| JP | 2013028738 | A | 2/2013 | |
| JP | 2013091702 | A | 5/2013 | |
| JP | 2014208810 | A | 11/2014 | |
| JP | 2014218633 | A | 11/2014 | |
| JP | 2014240174 | A | 12/2014 | |
| JP | 5700166 | B1 | 4/2015 | |
| JP | 2015105345 | A | 6/2015 | |
| WO | 2013162059 | A1 | 10/2013 | |
| WO | WO-2013162059 | A1 * | 10/2013 | C08L 53/02 |
| WO | 2013164976 | A1 | 11/2013 | |
| WO | 2014088015 | A1 | 6/2014 | |
| WO | 2015068385 | A1 | 5/2015 | |

OTHER PUBLICATIONS

Decision to Grant for European Patent Application No. 16834710.2 dated May 28, 2020; 1 pg.
Hirokazu Iizuka et al., Adhesive Resin Composition, Adhesive Resin Molded Article And Adhesive Resin Laminate, machine translation of JP 2013091702A, May 16, 2013.
Extended European Search Report for European Patent Application No. 20173640.2 dated Sep. 24, 2020.
Opposition Decision in Japanese Patent No. 6621262 dated Sep. 18, 2020, 38 pgs.
International Search Report dated Nov. 8, 2016 for PCT/IB2016/001088, 4pgs.
Written Opinion for PCT/IB2016/001088, dated Nov. 8, 2016, 10 pgs.
Extended European Search Report for European Patent Application No. 16834710.2 dated Feb. 6, 2019, 7 pgs.
Office Action for Japanese Patent Application No. 2015-156367 dated Mar. 19, 2019, 9 pgs.
Office Action for Japanese Patent Application No. 2015-156367 dated Aug. 6, 2019, 6 pgs.
Notice of Allowance for Japanese Patent Application No. 2015-156367 dated Oct. 23, 2019, 5 pgs.
Ninomiya, Yuichi et al., "Heat Adhesive Film For Sheet Joining", machine translation of JP 2011-083895A, Apr. 28, 2011. (Year: 2011).
Notice of Allowance in corresponding European Patent Application No. 20173640.2, dated Sep. 22, 2022; 71 pgs.

* cited by examiner

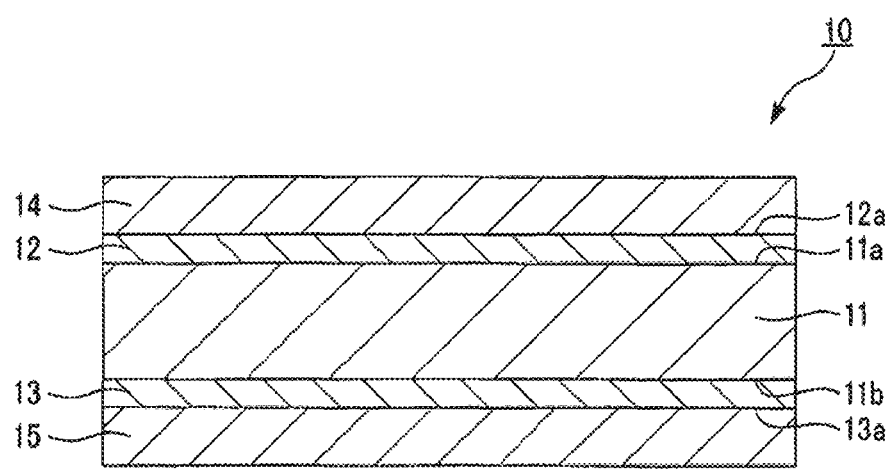

HOT-MELT ADHESIVE RESIN FILM AND PRODUCTION METHOD THEREOF

CROSS REFERENCE TO RELATED APPLICATION

This Application is a continuation of U.S. application Ser. No. 15/748,995 filed on Jan. 30, 2018, which is the National Phase of PCT/IB2016/001088 filed on Aug. 3, 2016, which, in turn, claimed the priority of Japanese Patent Application No. 2015-156367 which was filed on Aug. 6, 2015, the contents of which applications are incorporated herein by reference.

TECHNICAL FIELD

The present invention relates to a hot-melt adhesive resin film having excellent adhesiveness to various adherends, particularly metal, and a production method thereof.

BACKGROUND TECHNOLOGY

Previously, as an adhesive film which adheres to an adherend, a laminated film composed of a three-layer structure in which a thermosetting epoxy-based adhesive layer is formed on both sides of a substrate consisting of a heat-resistant resin film, as described in Patent Document 1, has been known, but it was not sufficient, with relation to adhesiveness to metal and durability.

Additionally, in the previous adhesive film, when adhesion with metal in particular is performed, adhesiveness is not sufficient, and adhesiveness could not also be retained after the severe durability conditions. Additionally, in the previous adhesive film having no substrate, there was a problem that when prepared into a laminate, the strength for keeping the laminate planar is not sufficient, and distortion is generated in the laminate. On the other hand, there was a problem that even when adhesion is performed using an adhesive film having a substrate, peeling occurs between layers of a laminate, and the sufficient strength as an adhesive cannot be retained.

DOCUMENTS OF RELATED ART

Patent Document

Patent Document 1: Japanese Unexamined Patent Application, First Publication No. 2013-028738

SUMMARY OF THE INVENTION

Problem to be Solved by the Invention

The present invention was made in view of the above-mentioned circumstances, and an object thereof is to provide a hot-melt adhesive resin film which does not cause peeling between respective layers, has an excellent adhesive force, and has strong durability even in severe durability evaluation, to various planar or film-like adherends such as metal, glass, and plastic, and a production method thereof.

Means for Solving the Problem

The present inventors investigated minutely and studied regarding an adhesive resin film also manifesting high durability in severer evaluation than before, to various planar or film-like adherends such as metal, glass, and plastic, and found out the lamination configuration of the present invention, resulting in completion of the present invention. That is, the present inventors found out a configuration that a heat-resistant base material is provided in a substrate layer to secure the strength as a laminate, an intermediate layer and a surface layer include polyolefin, respectively, thereby, adherence between the intermediate layer and the surface layer becomes good, and the intermediate layer includes a copolymer of propylene and 1-butene, thereby, adherence between the intermediate layer and the substrate layer is improved, and further, an acid-modified polyolefin is contained in the surface layer, and the acid-modified polyolefin in the surface layer secures adhesiveness with an adherend, resulting in completion of the present invention.

In order to solve the above-mentioned problems, the present invention provides a hot-melt adhesive resin film comprising a first surface layer, a first intermediate layer, a substrate layer having heat resistance, a second intermediate layer, and a second surface layer, which are laminated in this order, wherein the first intermediate layer and the second intermediate layer include a resin which is obtained by modifying a copolymer of propylene and 1-butene with maleic acid.

It is preferable that the first surface layer and the second surface layer contain a composition having an acid-modified polyolefin and an epoxy group-containing resin or a composition having an acid-modified polyolefin and an oxazoline group-containing resin.

It is preferable that the first surface layer and the second surface layer contain 80 parts by mass to 99.9 parts by mass of an acid-modified polyolefin resin (A), and 0.1 parts by mass to 20 parts by mass of an epoxy group-containing polyolefin-based resin (B) having a main chain which is obtained by copolymerizing an olefin compound and an epoxy group-containing vinyl monomer and a side chain bound to the main chain, and having a melting point of 80° C. to 120° C.

It is preferable that the first surface layer and the second surface layer contain 90 parts by mass to 99.9 parts by mass of an acid-modified polyolefin resin (A), and 0.1 parts by mass to 10 parts by mass of a phenol novolak-type epoxy resin (C) which is solid at an ambient temperature.

It is preferable that the first surface layer and the second surface layer contain 80 parts by mass to 99.9 parts by mass of an acid-modified polyolefin resin (A), and 0.1 to 20 parts by mass of an oxazoline group-containing styrene-based resin (D) having a number average molecular weight of 50,000 to 250,000.

It is preferable that the first intermediate layer and the second intermediate layer are layers which are formed by coating and drying a solution including the resin which is obtained by modifying a copolymer of propylene and 1-butene with maleic acid, and which have a film thickness after drying of 1 μm to 5 μm.

It is preferable that the substrate layer is one selected from the group consisting of polyethylene naphthalate, a cyclic olefin polymer, and a methylpentene polymer.

It is preferable that the substrate layer includes an inorganic filler.

Also, the present invention provides a method of producing the hot-melt adhesive resin film, the method comprising the steps of: coating on one surface and the other surface of the substrate layer a solution containing the resin which is obtained by modifying a copolymer of propylene and 1-butene with maleic acid to form a coated film, and drying the coated film to form the first intermediate layer and the second intermediate layer; forming a film to be the first surface layer and the second surface layer by a melt film forming method, the film comprising a composition having an acid-modified polyolefin and an epoxy group-containing resin or a composition having an acid-modified polyolefin and an oxazoline-group containing resin; and sticking the film to each of the first intermediate layer and the second intermediate layer which have been formed on one surface and the other surface of the substrate layer.

Effects of Invention

According to the present invention, a hot-melt adhesive resin film having an excellent adhesive force and durability, to various adherends such as metal, glass, and plastic, and a production method thereof can be provided. Particularly, a hot-melt adhesive resin film excellent in adhesion with metal can be provided.

BRIEF DESCRIPTION OF THE DRAWINGS

FIG. 1 is a cross-sectional view showing a schematic configuration of a hot-melt adhesive resin film which is one embodiment of the present invention.

BEST MODE FOR CARRYING OUT THE INVENTION

An embodiment of the hot-melt adhesive resin film of the present invention and a production method thereof will be illustrated.

In addition, the present embodiment more specifically illustrates the gist of the invention, but does not limit the present invention, unless particularly instructed.

[Hot-Melt Adhesive Resin Film]

FIG. 1 is a cross-sectional view showing a schematic configuration of the hot-melt adhesive resin film which is one embodiment of the present invention.

As shown in FIG. 1, a hot-melt adhesive resin film 10 of the present embodiment comprises a substrate layer 11 having heat resistance, a first intermediate layer 12 which is laminated on one side 11a of the substrate layer 11, a second intermediate layer 13 which is laminated on the other side 11b of the substrate layer 11, a first surface layer 14 which is laminated on a side (hereinafter, referred to as "one side") 12a of the first intermediate layer 12 opposite to the substrate layer 11, and a second surface layer 15 which is laminated on a side (hereinafter, referred to as "one side") 13a of the second intermediate layer 13 opposite to the substrate layer 11. That is, the hot-melt adhesive resin film 10 has the five-layer configuration that first surface layer 14/first intermediate layer 12/substrate layer 11/second intermediate layer 13/second surface layer 15 are laminated in this order as shown in FIG. 1.

A resin constituting the substrate layer 11 is not particularly limited as far as it is a resin having sufficient heat resistance, and examples thereof include synthetic resin films formed of polyester resins such as polyethylene naphthalate (PEN), polyethylene terephthalate (PET), and polybutylene terephthalate (PBT); polyolefin polymers such as a cyclic olefin polymer (COP) and a methylpentene polymer (TPX); and the like.

Among them, resins having a low linear expansion coefficient are preferable.

By using resins having a low linear expansion coefficient, contraction of a laminate becomes small when the laminate is heated or cooled, and a strain of a laminate including metal becomes small.

Additionally, as an additive, a particulate or fibrous filler can be introduced into the substrate layer 11. The filler may be a filler having high heat resistance, and includes an organic filler and an inorganic filler. By introducing the filler, a contractive force of the hot-melt adhesive resin film 10 can further be suppressed, and the strength of the hot-melt adhesive resin film 10 itself can also be enhanced. In the present invention, it is preferable to add the inorganic filler from a viewpoint of heat resistance and contractility of the substrate layer.

Examples of the inorganic filler include carbonates such as calcium carbonate, magnesium carbonate, and barium carbonate; sulfates such as calcium sulfate, magnesium sulfate, and barium sulfate; chlorides such as sodium chloride, calcium chloride, and magnesium chloride; oxides such as aluminum oxide, calcium oxide, magnesium oxide, zinc oxide, titanium oxide, and silica; minerals such as talc, smectite, mica, and kaolinite; carbon compounds such as carbon fiber and carbon particles; and fine particles consisting of glass. Additionally, examples of a shape include a spherical shape, a bar-like shape, a plate-like shape, and the like, and a plate-like compound is preferable.

As a resin used in the substrate layer 11, PEN and COP are preferable.

A thickness of the substrate layer 11 is preferably 25 μm to 250 μm, and more preferably 40 μm to 200 μm.

Additionally, a thickness of the substrate layer 11 is preferably about 30% to 80% of a thickness of a whole hot-melt adhesive resin film 10 (that is, the total thickness of substrate layer 11, first intermediate layer 12, second intermediate layer 13, first surface layer 14, and second surface layer 15).

A resin constituting the first intermediate layer 12 and the second intermediate layer 13 is a resin which manifests good adhesiveness to a polyolefin resin such as polypropylene. Specifically, as the resin constituting the first intermediate layer 12 and the second intermediate layer 13, a resin which is obtained by modifying a copolymer of propylene and 1-butene with maleic acid is used.

The first intermediate layer 12 and the second intermediate layer 13 are preferably formed by coating, and from a view point of the adhesive strength between layers, a thickness of the first intermediate layer 12 and the second intermediate layer 13 is preferably 0.5 μm to 10 μm, and more preferably 1 μm to 5 μm.

The resin which is obtained by modifying a copolymer of propylene and 1-butene with maleic acid has an advantage from a view point of adhesiveness between respective layers that, adhesiveness to olefin is good due to being an olefin-based elastomer, and tackiness is small after crystallization due to being crystalline.

The resin which is obtained by modifying a copolymer of propylene and 1-butene with maleic acid contains propylene at an amount of preferably 50 mol % to 95 mol %, more preferably 50 mol % to 80 mol %, and further preferably 60 mol % to 75 mol %. Additionally, the resin which is obtained by modifying a copolymer of propylene and 1-butene with maleic acid contains 1-butene at an amount of preferably 5 mol % to 50 mol %, more preferably 20 mol % to 50 mol %, and further preferably 25 mol % to 40 mol %.

Additionally, the resin which is obtained by modifying a copolymer of propylene and 1-butene with maleic acid may contain a unit derived from olefin other than propylene and 1-butene at an amount of preferably 10 mol % or less, and more preferably 5 mol % or less.

The limiting viscosity [η] which is measured in decalin at 135° C., of the resin which is obtained by modifying a copolymer of propylene and 1-butene with maleic acid is preferably 0.1 dl/g to 15 dl/g, more preferably 0.5 dl/g to 12 dl/g, and further preferably 1 dl/g to 10 dl/g.

A molecular weight distribution (Mw/Mn) which is obtained by gel permeation chromatography (GPC), of the resin which is obtained by modifying a copolymer of propylene and 1-butene is preferably 3.2 or less, more preferably 1.5 to 3.1, and further preferably 2.0 to 2.6.

A melting point Tm which is measured with a differential scanning calorimeter, of the resin which is obtained by modifying a copolymer of propylene and 1-butene with maleic acid is preferably 60° C. to 150° C., and more preferably 70° C. to 120° C.

The resin which is obtained by modifying a copolymer of propylene and 1-butene with maleic acid is obtained by graft-copolymerizing a copolymer of propylene and 1-butene with maleic acid or maleic anhydride which is a polar monomer.

Additionally, maleic acid or maleic anhydride is graft-copolymerized so that an amount thereof is preferably 0.1 parts by mass to 10 parts by mass and more preferably 0.5 parts by mass to 3 parts by mass, based on 100 parts by mass of a graft-copolymerized propylene-based elastomer. Herein, when maleic acid or maleic anhydride is 0.1 parts by mass or more, adhesiveness of the first intermediate layer 12 to the substrate layer 11 and the first surface layer 14 and adhesiveness of the second intermediate layer 13 to the substrate layer 11 and the second surface layer 15 become sufficient. On the other hand, when maleic acid or maleic anhydride is 10 parts by mass or less, brittleness of the first intermediate layer 12 and the second intermediate layer 13 is increased rarely, and there is a tendency that aggregation and peeling are caused little.

Examples of a method of modifying the copolymer of propylene and 1-butene with maleic acid include: a method of dissolving a propylene-based elastomer in an organic solvent, adding maleic acid or maleic anhydride and a radical polymerization initiator, and heating and stirring the mixture to perform a graft copolymerization reaction; a method of heating and melting a propylene-based elastomer, adding maleic acid or maleic anhydride and a radical polymerization initiator to the resulting melt, and stirring the mixture to perform graft copolymerization; a method of pre-mixing a propylene-based elastomer, maleic acid or maleic anhydride, and a radical polymerization initiator, and supplying the resulting mixture to an extruder to perform a graft copolymerization reaction while the mixture is heated and kneaded, a method of immersing a propylene-based elastomer with a solution which is obtained by dissolving maleic acid or maleic anhydride and a radical polymerization initiator in an organic solvent, heating the impregnation product to a maximum temperature at which the copolymer of propylene and 1-butene is not dissolved, and performing a graft copolymerization reaction; and the like.

The radical polymerization initiator is not particularly limited, as far as it promotes a reaction between the copolymer of propylene and 1-butene, and maleic acid or maleic anhydride, and an organic peroxide or an organic perester is preferable.

Examples of the radical polymerization initiator include specifically benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxide)hexane, tert-butyl benzoate, tert-butyl perphenyl acetate, tert-butyl perisobutyrate, tert-butyl per-sec-octoate, tert-butyl perpivalate, cumyl perpivalate, and tert-butyl perdiethylacetate. Additionally, examples of the radical polymerization initiator include azo compounds such as azobisisobutyronitrile and dimethyl azoisobutyronitrile.

Among them, dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane, and 1,4-bis(tert-butylperoxyisopropyl)benzene are preferable.

It is preferable that the radical polymerization initiator is used at an amount of about 0.005 parts by mass to 5 parts by mass, based on 100 parts by mass of the propylene-based elastomer.

The resin which is obtained by modifying a copolymer of propylene and 1-butene with maleic acid is produced by graft-polymerizing the copolymer of propylene and 1-butene with maleic acid or maleic anhydride by the above-mentioned method. Maleic acid or maleic anhydride is graft-copolymerized so that an amount thereof is preferably 0.1 parts by mass to 10 parts by mass, and more preferably 0.5 parts by mass to 3 parts by mass, based on 100 parts by mass of the resin which is obtained by modifying a copolymer of propylene and 1-butene with maleic acid.

The first surface layer 14 and the second surface layer 15 are formed of a composition having an acid-modified polyolefin resin and an epoxy group-containing resin or a composition having an acid-modified polyolefin resin and an oxazoline-group containing resin. In particular, it is preferable that the first surface layer 14 and the second surface layer 15 are formed of a composition having an acid-modified polyolefin resin and an epoxy-group containing polyolefin-based resin (first adhesive resin composition), a composition having an acid-modified polyolefin resin and a phenol novolak-type epoxy resin (second adhesive resin composition), or a composition having an acid-modified polyolefin resin and an oxazoline group-containing resin (third adhesive resin composition).

Plastic which is an adherend to be adhered using the hot-melt adhesive resin film 10 of the present embodiment is not particularly limited, but adhesion with a polyolefin-based, polyester-based or polyamide-based adherend is excellent.

A metal plate which is an adherend to be adhered using the hot-melt adhesive resin film 10 of the present embodiment is not particularly limited, and the generally known metal plate, metal planar plate or metal foil can be used. A metal of the metal plate may be, for example, iron, copper, aluminum, lead, zinc, titanium or chromium, or may be alloy such as stainless, or a metal or a non-metal, a surface of which has been treated by plating with metal or coating processing with a paint containing metal. Particularly preferable is a metal planar plate or a metal foil consisting of iron, aluminum, titanium, stainless or a surface-treated metal, and the firm adhesive strength can be realized.

[First Adhesive Resin Composition]

The first adhesive resin composition contains 80 parts by mass to 99.9 parts by mass of an acid-modified polyolefin resin (A) and 0.1 parts by mass to 20 parts by mass of an epoxy group-containing polyolefin-based resin (B) having a main chain which is obtained by copolymerizing an olefin compound and an epoxy group-containing vinyl monomer, and a side chain bound to the main chain, and having a melting point of 80° C. to 120° C.

Hereinafter, the acid-modified polyolefin resin (A) may be referred to as "(A) component", and the epoxy group-containing polyolefin-based resin (B) may be referred to as "(B) component".

(Acid-Modified Polyolefin Resin (A))

In the first adhesive resin composition, the acid-modified polyolefin resin (A) is a polyolefin-based resin modified with unsaturated carboxylic acid or a derivative thereof, having an acid functional group such as a carboxyl group or a carboxylic anhydride group in the polyolefin-based resin.

The (A) component is obtained by modification of a polyolefin-based resin with unsaturated carboxylic acid or a derivative thereof, copolymerization of an acid functional group-containing monomer and olefins, or the like. Among them, the (A) component which was obtained by acid-modifying the polyolefin-based resin is preferable.

Examples of the acid-modifying method include graft modification of melting and kneading the polyolefin resin and the acid functional group-containing monomer in the presence of a radial polymerization initiator such as an organic peroxide or an aliphatic azo compound.

Examples of the above-mentioned polyolefin-based resin include polyethylene, polypropylene, poly-1-butene, poly-isobutylene, a random copolymer of propylene with ethylene or α-olefin, a block copolymer of propylene with ethylene or α-olefin, and the like. Among them, a polypropylene-based resin such as homopolypropylene (propylene homopolymer, hereinafter, sometimes referred to as "homo PP"), a propylene-ethylene block copolymer (hereinafter, sometimes referred to as "block PP"), and a propylene-ethylene random copolymer (hereinafter, sometimes referred to as "random PP") is preferable, and random PP is particularly preferable.

Examples of the above-mentioned olefins when they are copolymerized include olefin-based monomers such as ethylene, propylene, 1-butene, isobutylene, 1-hexene, and α-olefins.

The acid functional group-containing monomer is a compound having an ethylenic double bond, and a carboxyl group or a carboxylic anhydride group in the same molecule, and examples thereof include various unsaturated monocarboxylic acids, dicarboxylic acids, or acid anhydrides of dicarboxylic acids.

Examples of the acid functional group-containing monomer having a carboxyl group (carboxyl group-containing monomer) include α, β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

As these acid functional group-containing monomers, one may be used alone, or two or more may be used by combining them, in the (A) component.

Among them, as the acid functional group-containing monomer, an acid functional group-containing monomer having an acid anhydride group is preferable, a carboxylic anhydride group-containing monomer is more preferable, and maleic anhydride is particularly preferable, due to high reactivity with a (B) component described later. When a part of the acid functional group-containing monomer used in acid-modification is unreacted, it is preferable to use, as an (A) component, a component from which an unreacted acid functional group-containing monomer has been removed in advance, in order to prevent reduction in an adhesive force due to an unreacted acid functional group-containing monomer.

In the (A) component, an amount of a component derived from the polyolefin-based resin or olefins is preferably 50 parts by mass or more, based on a total amount of 100 parts by mass of the (A) component.

A melting point of the (A) component is preferably 100° C. to 180° C., in view of a temperature at which the (A) component and the (B) component described later are melted and kneaded. By using the (A) component having a melting point in the above-mentioned range, the (A) component and the (B) component described later can be melted and kneaded at a temperature sufficiently higher than a melting point of the (A) component, also when the conventional method and the general apparatus are used. Additionally, when the (A) component and the (B) component described later are reacted by melting and kneading, it is preferable that a melting point of the (B) component is lower as compared with that of the (A) component, and a degree of freedom of selection of the (B) component can be enhanced by using the (A) component having a melting point in the above-mentioned range.

Additionally, as described above, it is preferable that a melting point of the (A) component is higher than a melting point of the (B) component described later, and a melting point of the (A) component is higher than a melting point of the (B) component more preferably by 10° C. or more, further preferably by 20° C. or more, and particularly preferably by 30° C. or more. By that a melting point of the (A) component is sufficiently higher than a melting point of the (B) component, upon melting and kneading, the (B) component is melted earlier, and permeated into the (A) component in the state where a shape of the resin is retained, to react therewith uniformly, and as a result, good durability can be obtained.

Among them, as the (A) component, maleic anhydride-modified polypropylene is preferable, from a view point of adhesiveness and a moderate melting point.

(Epoxy Group-Containing Polyolefin-Based Resin (B))

In the first adhesive resin composition, the epoxy group-containing polyolefin-based resin (B) is a resin having a main chain which is obtained by copolymerizing an olefin compound and an epoxy group-containing vinyl monomer, and a side chain bound to the main chain, and having a melting point of 80° C. to 120° C.

Main Chain

The main chain of the (B) component is obtained by copolymerizing an olefin compound, an epoxy group-containing vinyl monomer, and another arbitrary monomer which is used as needed.

Examples of the above-mentioned olefin compound include olefin-based monomers such as ethylene, propylene, 1-butene, isobutylene, 1-hexene, and α-olefin.

Examples of the above-mentioned epoxy group-containing vinyl monomer include glycidyl esters such as glycidyl methacrylate (GMA) and glycidyl acrylate; glycidyl ethers such as allyl glycidyl ether, epoxyalkenes such as epoxybutene; and the like.

As the olefin compound and the epoxy group-containing vinyl monomer, one may be used alone, or two or more may be used by combining them, respectively.

The main chain of the (B) component may contain one or more other monomers in addition to the olefin compound and the epoxy group-containing vinyl monomer. Examples of other monomers are not particularly limited, as far as they can be copolymerized with the olefin compound and the epoxy group-containing vinyl monomer, but include a (meth)acrylate monomer, a (meth)acrylic ester monomer, a (meth)acrylamide monomer, a styrene monomer, and the like.

In the copolymer which is to be the main chain of the (B) component, a constituting ratio of each monomer (compound) is not particularly limited, and a copolymer which is obtained by copolymerizing the epoxy group-containing vinyl monomer at 10% by mass to 30% by mass, and more preferably 10% by mass to 20% by mass, based on all monomers constituting the main chain of the (B) component is preferable. By using the epoxy group-containing vinyl monomer in the above-mentioned range, adhesiveness with an adherend can be suitably improved.

Among them, as the main chain of the (B) component, a copolymer which is obtained by copolymerizing the olefin compound and the epoxy group-containing vinyl monomer is preferable, and a copolymer of ethylene and glycidyl methacrylate is particularly preferable.

Side Chain

The (B) component can improve properties such as the strength, adhesiveness, and synthesis of the olefin-based copolymer, by having a side chain bound to the above-mentioned main chain. The side chain is not particularly limited, but examples thereof include styrene-based resins (polymers containing styrene) such as polystyrene and a styrene-acrylonitrile copolymer; (meth)acrylic-based resins which are obtained by polymerizing one or more of alkyl (meth)acrylate monomers such as methyl (meth)acrylate, ethyl (meth)acrylate, butyl (meth)acrylate, and pentyl (meth)acrylate; and the like.

Among them, as the side chain of the (B) component, polymers containing styrene are preferable, and examples thereof include polystyrene and a styrene-acrylonitrile copolymer. Among them, polystyrene is particularly preferable.

The (B) component having the above-mentioned main chain and side chain can be obtained, for example, by graft polymerization of a main chain copolymer which was obtained by the conventional method, a monomer constituting the side chain, and a radical polymerization initiator such as an organic peroxide or an aliphatic azo compound.

A melting point of the (B) components is 80° C. to 120° C., and preferably 90° C. to 110° C. The (B) component having such a melting point can be obtained by appropriately selecting monomer species constituting the main chain and the side chain.

By using the (B) component having a melting point in the above-mentioned range, it becomes possible to melt and knead the above-mentioned (A) component and (B) component at a temperature sufficiently higher than a melting point of the relevant (B) component also when the conventional method and the general apparatus are used, and an adhesive and a surface layer having excellent durability can be obtained. Additionally, when the above-mentioned (A) component and (B) component are reacted using melting and kneading, it is preferable that a melting point of the (B) component is lower as compared with that of the (A) component, and a degree of freedom of selection of the (A) component can be enhanced by using the (B) component having a melting point in the above-mentioned range.

As such (B) component, commercially available products such as Modiper A1100, A4100, and A4400 (all are product names) manufactured by NOF CORPORATION can also be used.

In the first adhesive resin composition, the (A) component is contained at 80 parts by mass to 99.9 parts by mass, whereas the (B) component is contained at 0.1 parts by mass to 20 parts by mass. More specifically, it is preferable that a proportion of the (A) component is 90 parts by mass to 99 parts by mass and a proportion of the (B) component is 1 part by mass to 10 parts by mass in the solid contents of the first adhesive resin composition.

If desired, a miscible additive, an additional resin, a plasticizer, a stabilizer, a coloring agent, and the like can be appropriately contained in the first adhesive resin composition.

It is thought that both of an acid functional group of the (A) component and an epoxy group of the (B) component function as adhesive functional groups to an adherend, and thereby, the first adhesive resin composition becomes possible to exert excellent adhesiveness to various adherends such as metal, glass, and plastic.

Additionally, it is thought that a part of an acid functional group of the (A) component and a part of an epoxy group of the (B) component are reacted to reinforce a dispersion structure of the (A) component and the (B) component, and thereby, good durability together with excellent adhesiveness is obtained.

[Second Adhesive Resin Composition]

The second adhesive resin composition contains 90 parts by mass to 99.9 parts by mass of an acid-modified polyolefin resin (A) and 0.1 parts by mass to 10 parts by mass of a phenol novolak-type epoxy resin (C) which is solid at an ambient temperature.

Hereinafter, the acid-modified polyolefin resin (A) may be referred to as "(A) component", and the phenol novolak-type epoxy resin (C) may be referred to as "(C) component".

(Acid-Modified Polyolefin Resin (A))

In the second adhesive resin composition, the acid-modified polyolefin resin (A) is the same as the acid-modified polyolefin resin (A) in the above-mentioned first adhesive resin composition.

(Phenol Novolak-Type Epoxy Resin (C))

In the second adhesive resin composition, the phenol novolak-type epoxy resin (C) is a phenol novolak-type epoxy resin which is solid at an ambient temperature. By using the (C) component which is solid at an ambient temperature, also when the above-mentioned (A) component and (C) component are polymerized by melting and kneading, melting and kneading can be performed in conformity with a melting temperature of the (A) component, and it allows properties of the (C) component to be hardly deteriorated thereupon.

In addition, in the present specification, an "ambient temperature" is about 3° C. to about 40° C., preferably about 10° C. to about 30° C., more preferably about 15° C. to about 25° C., and most preferably about 23° C.

In the second adhesive resin composition, the phenol novolak-type epoxy resin (C) is a polymer compound having a fundamental structure of a phenol novolak resin which is obtained by acid condensing phenol and formaldehyde, in which an epoxy group is introduced into a part of the structure. An amount of an epoxy group to be introduced per one molecule in the phenol novolak-type epoxy resin is not particularly limited, and since many epoxy groups are introduced into phenolic hydroxy groups existing at the great number in the phenol novolak resin by reacting an epoxy group raw material such as epichlorohydrin and a phenol novolak resin, the phenol novolak-type epoxy resin usually becomes a polyfunctional epoxy resin.

Among them, as the (C) component, a resin having a phenol novolak structure as a fundamental skeleton as well as a bisphenol A structure is preferable. In addition, the bisphenol A structure in the (C) component may be a structure which can be derived from bisphenol A, and hydroxy groups at both ends of bisphenol A may have been substituted with a group such as an epoxy group-containing group.

One example of the (C) component includes a resin represented by the following general formula (1).

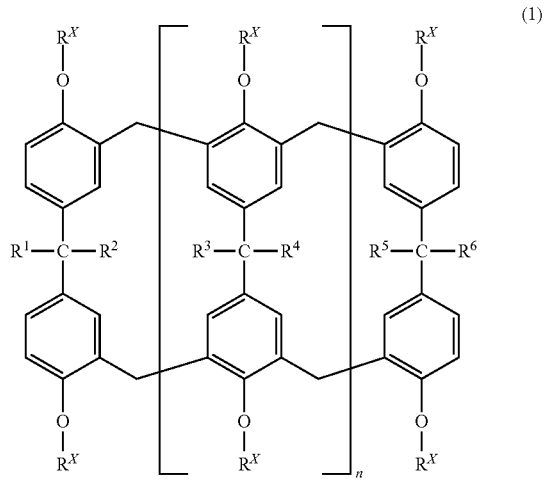

[In the formula (1), $R^1$ to $R^6$ are each independently a hydrogen atom or a methyl group, n is an integer of 0 to 10, and $R^X$ is a group having an epoxy group.]

In the above-mentioned general formula (1), $R^1$ to $R^6$ are each independently a hydrogen atom or a methyl group. When n is an integer of 2 or more, $R^3$ and $R^4$ may be the same or different.

It is preferable that the resin represented by the above-mentioned general formula (1) satisfies at least any one of the following (i) to (iii).

(i) Both $R^1$ and $R^2$ are methyl groups.
(ii) Both $R^3$ and $R^4$ are methyl groups.
(iii) Both $R^5$ and $R^6$ are methyl groups.

For example, by satisfying the above-mentioned (i), it follows that a carbon atom to which $R^1$ and $R^2$ bind in the above-mentioned general formula (1), and two hydroxyphenyl groups to which the relevant carbon atom bind, constitute a structure which is derived from bisphenol A.

In the above-mentioned general formula (1), $R^X$ is a group having an epoxy group. Examples of the group having an epoxy group include an epoxy group, a combination of an epoxy group and an alkylene group, and the like, and inter alia, a glycidyl group is preferable.

An epoxy equivalent of the (C) component is preferably 100 to 300, and more preferably 200 to 300. An epoxy equivalent (g/eq) is a molecular weight of an epoxy resin per one epoxy group, and means that as this value is smaller, the number of epoxy groups in the resin is larger. By using the (C) component having a relatively small epoxy equivalent, even when an addition amount of the (C) component is relatively small, adhesiveness between the (C) component and an adherend becomes good, and the (C) component and the above-mentioned (A) component are sufficiently cross-linked.

As such (C) component, commercially available products such as jER154, jER157S70, and jER-157S65 manufactured by Mitsubishi Chemical Corporation; EPICLON N-730A, EPICLON N-740, EPICLON N-770, and EPICLON N-775 manufactured by DIC CORPORATION (all are product names) can also be used.

In the second adhesive resin composition, it is preferable that the (A) component is contained at 90 parts by mass to 99.9 parts by mass, whereas the (C) component is contained at 0.1 parts by mass to 10 parts by mass, it is more preferable that the (A) component is contained at 95 parts by mass to 99.9 parts by mass, whereas the (C) component is contained at 0.1 parts by mass to 5 parts by mass, and it is further preferable that the (A) component is contained at 97 parts by mass to 99 parts by mass, whereas the (C) component is contained at 1 part by mass to 3 parts by mass.

The second adhesive resin composition can appropriately contain a miscible additive, an additional resin, a plasticizer, a stabilizer, a coloring agent, and the like, if desired.

It is thought that both of an acid functional group of the (A) component and an epoxy group of the (C) component function as adhesive functional groups to an adherend (particularly, functional group such as hydroxy group possessed by adherend), and thereby, the second adhesive resin composition becomes possible to exert excellent adhesiveness to various adherends such as metal, glass, and plastic.

Additionally, a part of an acid functional group of the (A) component and a part of an epoxy group of the (C) component are reacted to form a crosslinked structure of the (A) component and the (C) component, the strength of the resin is reinforced by this crosslinked structure, and good durability together with excellent adhesiveness is obtained.

[Third Adhesive Resin Composition]

The third adhesive resin composition contains 80 parts by mass to 99.9 parts by mass of an acid-modified polyolefin resin (A) and 0.1 parts by mass to 20 parts by mass of an oxazoline group-containing styrene-based resin (D) having a number average molecular weight of 50,000 to 250,000.

Hereinafter, the acid-modified polyolefin resin (A) may be referred to as "(A) component", and the oxazoline group-containing styrene-based resin (D) may be referred to as "(D) component".

(Acid-Modified Polyolefin Resin (A))

In the third adhesive resin composition, the acid-modified polyolefin resin (A) is the same as the acid-modified polyolefin resin (A) in the above-mentioned first adhesive resin composition.

(Oxazoline Group-Containing Styrene-Based Resin (D))

In the third adhesive resin composition, the oxazoline group-containing styrene-based resin (D) is an oxazoline group-containing styrene-based resin having a number average molecular weight of 50,000 to 250,000. By possession of an oxazoline group by the (D) component, the oxazoline group of the (D) component and the acid functional group (for example, carboxy group, carboxylic acid group, and the like) of the above-mentioned (A) component are reacted to form a crosslinked structure. For example, in the case where the acid functional group of the (A) component is a carboxy group, a crosslinking reaction shown by the following formula (2) occurs to form an amide ester bond. It is thought that, as a result, it follows that the (D) component reinforces the (A) component which is to be a main resin, crosslinking of the (A) component is more enhanced, and good durability together with excellent adhesiveness is obtained.

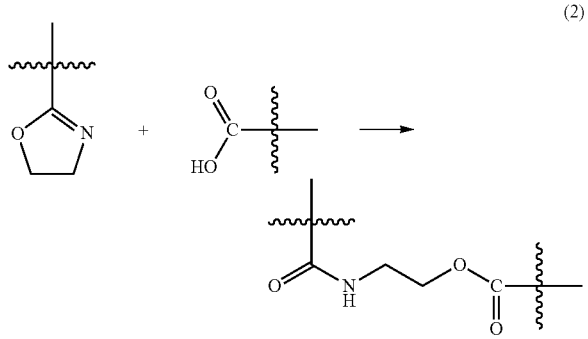

(2)

Among them, as the (D) component, a resin which is obtained by copolymerizing a styrene-based monomer and an oxazoline group-containing monomer is preferable.

As the styrene-based monomer, styrene and derivatives thereof can be used. Specifically, examples thereof include styrene; alkylstyrenes such as □-methylstyrene, methylstyrene, dimethylstyrene, trimethylstyrene, ethylstyrene, diethylstyrene, triethylstyrene, propylstyrene, butylstyrene, hexylstyrene, heptylstyrene, and octylstyrene; halogenated styrenes such as chlorostyrene, fluorostyrene, bromostyrene, dibromostyrene, and iodostyrene; and the like. Among them, styrene is preferable.

As far as the oxazoline group-containing monomer is a monomer which contains an oxazoline group and is copolymerizable with the styrene-based monomer, a skeleton thereof is not particularly limited, and a monomer having an oxazoline group and a vinyl group can be suitably used.

Examples of the oxazoline group-containing vinyl monomer include 2-vinyl-2-oxazoline, 5-methyl-2-vinyl-2-oxazoline, 4,4-dimethyl-2-vinyl-2-oxazoline, 2-isopropenyl-2-oxazoline, 4,4-dimethyl-2-isopropenyl-2-oxazoline, 4-acryloyl-oxymethyl-2,4-dimethyl-2-oxazoline, 4-methacryloyloxymethyl-2,4-dimethyl-2-oxazoline, 4-methacryloyloxymethyl-2-phenyl-4-methyl-2-oxazoline, 2-(4-vinylphenyl)-4,4-dimethyl-2-oxazoline, 4-ethyl-4-hydroxymethyl-2-isopropenyl-2-oxazoline, 4-ethyl-4-carboethoxymethyl-2-isopropenyl-2-oxazoline, and the like. Among them, 2-isopropenyl-2-oxazoline is preferable.

As the styrene-based monomer and the oxazoline group-containing monomer, one may be used alone, or two or more may be used by combining them, respectively.

Additionally, the (D) component may contain one or more other monomers, in addition to the styrene-based monomer and the oxazoline group-containing monomer. Other monomers are not particularly limited as far as they are copolymerizable with these monomers, and examples thereof include a (meth)acrylate monomer, a (meth)acrylic ester monomer, a (meth)acrylamide monomer, and the like.

In the (D) component, a constituting ratio of each monomer is not particularly limited, but a resin which is obtained by copolymerizing the oxazoline group-containing monomer at 5% by mass to 50% by mass, and more preferably 10% by mass to 30% by mass, based on all monomers constituting the (D) component is preferable. By using the oxazoline group-containing monomer in the above-mentioned range, the above-mentioned (A) component and (D) component can be sufficiently crosslinked to obtain good durability.

A number average molecular weight of the (D) component is 50,000 to 250,000, preferably 60,000 to 100,000, and further preferably 60,000 to 80,000. By using the (D) component having a number average molecular weight in the above-mentioned range, compatibility between the (A) component and the (D) component is improved, and it becomes possible to sufficiently crosslink the (A) component and the (D) component.

As such (D) component, commercially available products such as EPOCROS RPS-1005 (product name) manufactured by NIPPON SHOKUBAI CO., LTD. can be used.

In the third adhesive resin composition, the (D) component is contained at 0.1 parts by mass to 20 parts by mass, based on 80 parts by mass to 99.9 parts by mass of the (A) component. Inter alia, it is preferable that the (D) component is contained at 0.1 parts by mass to 10 parts by mass, based on 90 parts by mass to 99.9 parts by mass of the (A) component, and it is preferable that the (D) component is contained at 1 part by mass to 5 parts by mass, based on 95 parts by mass to 99 parts by mass of the (A) component.

In the third adhesive resin composition, since an acid functional group of the (A) component and an oxazoline group of the (D) component are easily reacted by heating, it is not necessary to additionally blend a curing agent which can react with these functional groups, and optionally, a miscible additive, an additional resin, a plasticizer, a stabilizer, a coloring agent, and the like can be appropriately contained.

It is thought that an acid functional group of the (A) component functions as an adhesive functional group to an adherend, and thereby, the third adhesive resin composition becomes possible to exert excellent adhesiveness to various adherends such as metal, glass, and plastic.

Additionally, it is thought that a part of an acid functional group of the (A) component and a part of an oxazoline group of the (D) component react to reinforce the (A) component which is to be a main resin, thereby, crosslinking of the (A) component becomes firmer, and good durability together with excellent adhesiveness can be obtained. In addition, when an adherend has a carboxyl group, the oxazoline group also functions as an adhesive functional group.

A thickness of the first surface layer 14 and the second surface layer 15 is preferably 5 μm to 50 μm and more preferably 10 μm to 30 μm, respectively.

Additionally, it is preferable that a total thickness of the first surface layer 14 and the second surface layer 15 is about 15% to 75% of a thickness of a whole hot-melt adhesive resin film 10 (that is, the total thickness of substrate layer 11, first intermediate layer 12, second intermediate layer 13, first surface layer 14, and second surface layer 15).

A resin constituting the first surface layer 14 and a resin constituting the second surface layer 15 may be the same or different in such a range that the first surface layer 14 and the second surface layer 15 satisfy the above-mentioned adhesiveness.

Since the hot-melt adhesive resin film 10 of the present embodiment is such that the first surface layer 14, the first intermediate layer 12, the substrate layer 11 having heat resistance, the second intermediate layer 13, and the second surface layer 15 are laminated in this order, and the first surface layer 14 and second surface layer 15 are formed of a composition having an acid-modified polyolefin and an epoxy group-containing resin or a composition having an acid-modified polyolefin and an oxazoline-group containing resin, the film has excellent adhesiveness and durability to various adherends such as metal, glass, and plastic.

[Method of Producing Hot-Melt Adhesive Resin Film]

Examples of a method of producing the hot-melt adhesive resin film which is one embodiment of the present invention include film formation by a solution flow casting method or a melt flowing casting method, and a lamination method by lamination by coating or a melt-extruding method, and a laminated film can be obtained by combining them.

For the substrate layer 11, film formation by a melt flow casting method is preferable.

For the first intermediate layer 12 and the second intermediate layer 13 in the hot-melt adhesive resin film of the present invention, both of film formation by coating and lamination on the substrate layer by a melt-extruding method can be adopted, and lamination by coating is preferable.

For the first surface layer 14 and the second surface layer 15 in the hot-melt adhesive resin film of the present invention, both of a method of performing film formation by film formation by a solution flow casting method or film formation by a melt flow casting method, and thereafter, performing lamination, and a method of performing lamination by coating or lamination by a melt-extruding method can be adopted, and it is preferable to perform film formation by a melt flow casting method, and thereafter, perform lamination.

When the first surface layer 14 and the second surface layer 15 are formed by film formation by a melt flow casting method, it is preferable to form a film as a monolayer film by melt flow casting, apart from the substrate layer 11, the first intermediate layer 12, and the second intermediate layer 13. A film to be a surface layer, which has been obtained by film formation by melt flow casting, can be laminated as the first surface layer 14 and the second surface layer 15, on surfaces of a laminate of first intermediate layer 14/substrate layer 11/second intermediate layer 15. At that time, the first intermediate layer 12 and the second intermediate layer 13 also function as a lamination adhesive.

When the surface layer is formed by solution flow casting, both of a method of forming the first surface layer 14 and the second surface layer 15 by sequentially performing coating and drying and a method of forming the first surface layer 14 and the second surface layer 15 by performing coating and drying simultaneously on a front surface and a back surface can be adopted.

When the first intermediate layer 12 and the second intermediate layer 13 are laminated by solution coating, a solution including the above-mentioned resin which is obtained by modifying a copolymer of propylene and 1-butene with maleic acid is coated on one surface 11a and the other surface 11b of a film-like substrate layer 11 which has been formed into a predetermined thickness, to form a coated film, the coated film is dried to form a first intermediate layer 12 on one surface 11a of the substrate layer 11 and to form a second intermediate layer 13 on the other surface 11b of the substrate layer 11 (step of forming first intermediate layer 12 and second intermediate layer 13).

It is preferable that the copolymer of propylene and 1-butene constituting the first intermediate layer 12 and the second intermediate layer 13 has a lower molecular weight than that of propylene contained in an outermost surface. Additionally, it is preferable that the copolymer of propylene and 1-butene constituting the first intermediate layer 12 and the second intermediate layer 13 has a lower melting point than that of propylene contained in an outermost surface.

When the first intermediate layer 12 and the second intermediate layer 13 are laminated by solution coating, examples of a solvent which is used for dissolving the resin which is obtained by modifying the copolymer of propylene and 1-butene with maleic acid to prepare a solution include organic solvents such as alcohols such as methanol, ethanol, and isopropyl alcohol; aromatic hydrocarbons such as toluene and xylene; aliphatic hydrocarbons such as hexane, heptane, and octane; alicyclic hydrocarbons such as cyclohexane and methylcyclohexane; ketones such as acetone, methyl ethyl ketone, and methyl isobutyl ketone; and dimethylformamide. Usually, aromatic hydrocarbons such as toluene and xylene are used.

Alternatively, the resin may be used by dispersing it in water.

An epoxy compound, an oxazoline compound or an isocyanate compound can be added as a crosslinking agent to the first intermediate layer 12 and the second intermediate layer 13 to perform crosslinking. The added crosslinking agent performs crosslinking by heating at drying after film formation or at processing of lamination with an outermost surface layer, or at a later heating step, and molecular crosslinking of the intermediate layer is increased.

When an outermost surface layer is formed by coating, examples of a solvent which is used for dissolving a composition having an acid-modified polyolefin and an epoxy group-containing resin or a composition having an acid-modified polyolefin and an oxazoline group-containing resin to prepare a solution include organic solvents such as alcohols such as methanol, ethanol, and isopropyl alcohol; aromatic hydrocarbons such as toluene and xylene; ketones such as acetone, methyl ethyl ketone, and methyl isobutyl ketone; and dimethylformamide.

Then, a film to be the first surface layer 14 is stuck on the first intermediate layer 12 which has been formed on one surface 11a of the substrate layer 11, to laminate the first surface layer 14 on one surface 12a of the first intermediate layer 12, and a film to be the second surface layer 15 is stuck on the second intermediate layer 13 which has been formed on the other surface 11b of the substrate layer 11, to laminate the second surface layer 15 on one surface 13a of the second intermediate layer 13, to obtain a hot-melt adhesive resin film 10 having a predetermined thickness, in which first surface layer 14/first intermediate layer 12/substrate layer 11/second intermediate layer 13/second surface layer 15 are laminated in this order.

According to the method for producing the hot-melt adhesive resin film of the present embodiment, the first intermediate layer 12 and the second intermediate layer 13 can be formed by coating of a solution including the above-mentioned resin which is obtained by modifying the copolymer of propylene and 1-butene with maleic acid, and the hot-melt adhesive resin film 10 having a predetermined thickness can be produced by performing lamination with films to be the first surface layer 14 and the second surface layer 15, which have separately been obtained by melt flow casting, including the above-mentioned composition having an acid-modified polyolefin and an epoxy group-containing resin or composition having an acid-modified polyolefin and an oxazoline-group containing resin, and thus, it is preferable to produce the film 10 by the above-mentioned production method.

EXAMPLES

The present invention will be further specifically illustrated below by way of Examples and Comparative Examples, but the present invention is not limited to the following Examples.

Examples 1 to 17 and Comparative Examples 1 to 5

(Adhesive Resin Film)

Materials (a), (b), and (c) shown in Tables 1, 2, and 3 were used.

The material (b) was dissolved in a solvent to prepare a solution, the solution was coated on one surface and the other surface of a substrate layer to form a coated film, and the coated film was dried to form a first intermediate layer and a second intermediate layer so that each thickness after drying became 2 μm.

Separately, the material (c) was formed into films having a desired thickness by melt flow casting to form films to be a first surface layer and a second surface layer.

Then, the film to be a first surface layer, having adhesiveness was laminated on the first intermediate layer which had been formed on one surface of the substrate layer to laminate the first surface layer on one surface of the first intermediate layer, and the film to be a second surface layer was laminated on the second intermediate layer which had been formed on the other surface of the substrate layer to laminate the second surface layer on one surface of the second intermediate layer, to obtain an adhesive resin film having a predetermined thickness, in which first surface layer/first intermediate layer/substrate layer/second intermediate layer/second surface layer were laminated in this order. A film thickness of each layer was 40 μm in the first layer, 2 μm in the first intermediate layer, 75 μm in the substrate layer, 2 μm in the second intermediate layer, and 40 μm in the second surface layer.

The material (a) is a material including a resin constituting the substrate layer, the material (b) is a material including a resin constituting the first intermediate layer and the second intermediate layer, and the material (c) is a material including a resin constituting the first surface layer and the second surface layer.

As a solvent for dissolving the material (b), ethyl acetate was used.

Each abbreviation in Tables 1, 2, and 3 has the following meaning, respectively. A numerical value in [ ] is a blending amount (part by mass).
(Substrate Layer)
TPX: Film which was obtained by forming a methylpentene polymer into a film at 75 μm
COP: Film which was obtained by forming a cyclic olefin polymer into a film at 75 μm
CPP: Undrawn polypropylene film which was obtained by forming a polypropylene resin (PF380A, manufactured by SUN AROMA CO., LTD.) at a thickness of 70 μm
PEN: Film which was obtained by forming polyethylene naphthalate into a film at 75 μm
In Table 2, films were formed as those including an inorganic filler at the described ratios.
(Adhesive Component)
(A): Maleic anhydride-modified polypropylene (melting point 140° C.)
(B): "Modiper A4100" (product name, manufactured by NOF CORPORATION) (graft polymer of ethylene-glycidyl methacrylate copolymer and polystyrene; ratio of glycidyl methacrylate monomer to all monomers in main chain=30% by mass; melting point 97° C.)
(C): "jER157S70" (product name, manufactured by Mitsubishi Chemical Corporation) (phenol novolak-type epoxy resin having bisphenol A structure; viscosity=80; epoxy equivalent=210)
(D) "EPOCROS RPS-1005" (product name, manufactured by NIPPON SHOKUBAI CO., LTD.) (resin which was obtained by copolymerizing styrene and 2-isopropenyl-2-oxazoline; number average molecular weight=70,000)
(E) Resin which was obtained by modifying copolymer of propylene and 1-butene with maleic acid: dispersion in solvent, of resin which was obtained by modifying copolymer of propylene and 1-butene, having weight average molecular weight of 300,000 and propylene content of 70 mol %, with maleic anhydride at amount of 1 mol %

Copolymer of propylene and 1-butene: dispersion in solvent, of copolymer of propylene and 1-butene, having weight average molecular weight of 300,000 and propylene content of 70 mol %
Polypropylene (PP): polypropylene resin (PF380A, manufactured by SUN AROMA CO., LTD.)
Maleic acid-modified polypropylene (maleic acid-modified PP): ADMER QE060 (product name, manufactured by Mitsui Chemicals, Inc.)
EPICLON (product name): manufactured by DIC CORPORATION
(Evaluation of Adhesiveness Between Metal, and First Surface Layer and Second Surface Layer—Evaluation of Adhesiveness 1)

Each of adhesive resin films of Examples 1 to 10 and Comparative Examples 1 to 5 which had been excised into 10 mm-10 mm was laminated on a stainless plate having a thickness of 5 mm, and a length and a width of 30 mm×10 mm, an end part of an aluminum foil which had been cut into a thickness of 30 μm, and a length and a width of 30 mm×10 mm was placed thereon, and they were stuck at 150° C. for 5 seconds while a pressure of 0.5 MPa was applied, and thereby, a laminate having an adhesion area of 100 mm² was obtained.

The resulting laminate was soaked in hot water at 95° C. for 300 hours, an end part of the laminate after soaking was pulled with a clamp of a tensile testing machine at a rate of 300 mm/min in a direction of 900, and the peeled state was observed visually. The results are shown in Tables 1 and 2.

Based on the following evaluation criteria, peeling between metal and the surface layer was observed.
○: Peeling at an adhered surface between metal and the laminate did not occur until an aluminum foil was ruptured.
Δ: Peeling slightly occurred at an adhered surface between metal and the laminate before an aluminum foil was ruptured.
x: Peeling was easily generated at an adhered surface between metal and the laminate before an aluminum foil was ruptured, and the peeling-off was observed.
(Evaluation of Adhesiveness Between Layers of Adhesive Resin Film—Evaluation of Adhesiveness 2)

Simultaneously with the above-mentioned evaluation of adhesiveness between metal, and first surface layer and second surface layer, the state between layers of the laminate was observed and evaluated.
○: Peeling between layers of the laminate did not occur until an aluminum foil was ruptured.
Δ: Peeling occurred between layers of the laminate before an aluminum foil was ruptured.
x: Peeling was easily generated in the laminate before an aluminum foil was ruptured, and the peeling-off was observed.

In addition, in the case where both of evaluation of adhesiveness 1 and evaluation of adhesiveness 2 are "○" in the evaluations of adhesiveness, this indicates that both of peeling between metal and the laminate and peeling between layers of the laminate did not occur until an aluminum foil was ruptured. In the case where there is "○" in either of evaluation of adhesiveness 1 or evaluation of adhesiveness 2, and there is "Δ" or "x" in either of them, this indicates that either peeling was observed or peeling was observed between layers of either of them. Additionally, in the case where there is "x" in both of evaluation of adhesiveness 1 and evaluation of adhesiveness 2, this indicates that intense peeling was observed between layers of all of them.

(Evaluation of Durability of Laminate)

Each of adhesive resin films of Examples 1 to 10 and Comparative Examples 1 to 5 which had been excised into 10 mm×10 mm was laminated on an aluminum foil having a thickness of 30 μm and a length of 30 mm×a width of 30 mm, an end part of a stainless foil which had been cut into a thickness of 300 μm and a length of 30 mm×a width of 30 mm was placed thereon, and they were stuck at 150° C. for 5 seconds while a pressure of 0.5 MPa was applied, and thereby, a laminate was obtained.

The resulting laminate was placed into dried high temperature thermos equipment at 120° C. for 1,000 hours. After placement, the laminate was taken out, the state of the laminate was observed, and peeling was observed visually. The results are shown in Tables 1 and 2.

Evaluation was performed based on the following evaluation criteria.

⊙: There was no visible peeling, and the state was good.
○: Visible prominent peeling was not observed.
Δ: Peeling was observed at several places.
x: Peeling was observed on a whole surface.

(Shape Retainability at Adhesion)

Each of adhesive resin films of Examples 1 to 10 and Comparative Examples 1 to 5 which had been excised into 10 mm×10 mm was laminated on an aluminum foil having a thickness of 30 μm and a length of 30 mm×a width of 30 mm, an end part of a stainless foil which had been cut into a thickness of 300 μm and a length of 30 mm×a width of 30 mm was placed thereon, and they were stuck at 150° C. for 5 seconds while a pressure of 0.5 MPa was applied, and thereby, a laminate was obtained.

The laminate immediately after lamination was soaked in hot water at 95° C. for 300 hours, the state of the laminate was observed, and peeling was observed visually. The results are shown in Tables 1, 2, and 3.

Evaluation was performed based on the following evaluation criteria.

⊙: Visible distortion of the laminate was not observed.
○: Visible intense distortion was not observed.
Δ: Distortion of the laminate was observed.
x: A whole surface of the laminate was intensely distorted, or irregularities were intense.

TABLE 1

| | (a) Substrate layer | (b) Undercoating layer | (c) Adhesive layer Resin component | (c) Adhesive layer Additive component | Evaluation of adhesiveness between metal and surface layer | Evaluation of adhesiveness between layers of adhesive resin film - evaluation of adhesiveness 1 | Evaluation of durability of laminate- evaluation of adhesiveness 2 | Shape retainability at adhesion |
|---|---|---|---|---|---|---|---|---|
| Example 1 | PEN | (E) | (A) [98] | (B) [2] | ○ | ○ | ⊙ | ⊙ |
| Example 2 | PEN | (E) | (A) [98] | (C) [2] | ○ | ○ | ⊙ | ○ |
| Example 3 | PEN | (E) | (A) [98] | (D) [2] | ○ | ○ | ⊙ | ○ |
| Example 4 | PEN | Copolymer of propylene and 1-butene | (A) [98] | (B) [2] | ○ | ○ | ○ | ○ |
| Example 5 | PEN | (E) | (A) [100] | — | Δ | ○ | Δ | ○ |
| Comparative Example 1 | PEN | (E) | EPICLON | — | X | ○ | X | Δ |
| Comparative Example 2 | PEN | None | (A) [100] | — | X | X | X | ○ |
| Comparative Example 3 | PEN | None | (A) [98] | (B) [2] | ○ | X | Δ | Δ |
| Comparative Example 4 | PEN | PP | (A) [98] | (B) [2] | ○ | X | X | X |

TABLE 2

| | (a) Substrate layer | (b) Undercoating layer | (c) Adhesive layer Resin component | (c) Adhesive layer Additive component | Evaluation of adhesiveness between metal and surface layer | Evaluation of adhesiveness between layers of adhesive resin film- evaluation of adhesiveness 1 | Evaluation of durability of laminate- evaluation of adhesiveness 2 | Shape retainability at adhesion |
|---|---|---|---|---|---|---|---|---|
| Example 6 | TPX | (E) | (A) [98] | (B) [2] | ○ | ○ | ○ | ⊙ |
| Example 7 | TPX | (E) | (A) [98] | (C) [2] | ○ | ○ | ○ | ○ |
| Example 8 | TPX | (E) | (A) [98] | (D) [2] | ○ | ○ | ○ | ○ |
| Example 9 | COP | (E) | (A) [98] | (B) [2] | ○ | ○ | ○ | ⊙ |
| Example 10 | COP | (E) | (A) [98] | (C) [2] | ○ | ○ | ○ | ○ |
| Example 11 | COP | (E) | (A) [98] | (D) [2] | ○ | ○ | ○ | ○ |
| Comparative Example 5 | CCP | (E) | (A) [98] | (B) [2] | ○ | ○ | X | X |

TABLE 3

| | (a) Substrate layer | | (b) Undercoating layer | (c) Adhesive layer | | Evaluation results |
|---|---|---|---|---|---|---|
| | Polymer | Inorganic filler | | Resin component | Additive component | Shape retainability at adhesion |
| Example 12 | PEN | None | (E) | (A) [90] | (B) [10] | ○ |
| Example 13 | TPX | None | (E) | (A) [90] | (B) [10] | ○ |
| Example 14 | COP | None | (E) | (A) [90] | (9) [10] | ○ |
| Example 15 | PEN | Calcium carbonate [10] | (E) | (A) [90] | (B) [10] | ◉ |
| Example 16 | TPX | Silica [10] | (E) | (A) [90] | (B) [10] | ◉ |
| Example 17 | COP | Talc [10] | (E) | (A) [90] | (B) [10] | ◉ |

From the results shown in Tables 1 and 2, it could be confirmed in evaluation of the laminate using the hot-melt adhesive resin film of the present invention that the holt melt adhesive resin film of the present invention has excellent adhesiveness to metal. Additionally, it could be confirmed that the laminate using the hot-melt adhesive resin film of the present invention has excellent adhesiveness between layers of the adhesive resin film. Additionally, it could be confirmed that the laminate using the hot-melt adhesive resin film of the present invention has excellent durability even after severe durability assessment, and it was seen that the hot-melt adhesive resin film of the present invention is a hot-melt adhesive resin film which is hardly warped, and is also useful in production of a laminate.

Comparative Example 1 was insufficient in adhesiveness of an adhesive component.

It was seen that since the intermediate layers do not exist in Comparative Example 2 and Comparative Example 3, durability of the laminate is inferior. In Comparative Example 4, the intermediate layers are polypropylene, but do not include 1-butene, and accordingly, peeling was observed in the intermediate layers and durability was also insufficient.

It was seen that in Comparative Example 5, since the substrate layer comprises an undrawn polypropylene film, and undrawn polypropylene is a material having low heat resistance, distortion is observed in the laminate after lamination, or there is unevenness in a thickness, and a shape cannot be retained.

From the results shown in Table 3, it was seen that shape retainability at adhesion is improved by inclusion of an inorganic filler by the substrate layer.

What is claimed:

1. A hot-melt adhesive resin film comprising a first surface layer, a first intermediate layer, a substrate layer having heat resistance, a second intermediate layer, and a second surface layer, which are laminated in this order,
    wherein said first intermediate layer and said second intermediate layer consist of a resin which is obtained by modifying a copolymer of propylene and 1-butene with maleic acid,
    said first surface layer and said second surface layer include a composition having an acid-modified polyolefin resin (A),
    a resin constituting said substrate layer includes at least one selected from the group consisting of a polyester resin, a cyclic olefin polymer and a methylpentene polymer, and
    said polyester resin is polyethylene naphthalate, polyethylene terephthalate, or polybutylene terephthalate.

2. The hot-melt adhesive resin film according to claim 1, wherein said first surface layer and said second surface layer contain 80 parts by mass to 99.9 parts by mass of the acid-modified polyolefin resin (A), and 0.1 parts by mass to 20 parts by mass of an epoxy group-containing polyolefin-based resin (B) having a main chain which is obtained by copolymerizing an olefin compound and an epoxy group-containing vinyl monomer and a side chain bound to said main chain, and having a melting point of 80° C. to 120° C.

3. The hot-melt adhesive resin film according to claim 1, wherein said first surface layer and said second surface layer contain 90 parts by mass to 99.9 parts by mass of the acid-modified polyolefin resin (A), and 0.1 parts by mass to 10 parts by mass of a phenol novolak epoxy resin (C).

4. The hot-melt adhesive resin film according to claim 1, wherein said first surface layer and said second surface layer contain 80 parts by mass to 99.9 parts by mass of the acid-modified polyolefin resin (A) and 0.1 to 20 parts by mass of an oxazoline group-containing styrene-based resin (D) having a number average molecular weight of 50,000 to 250,000.

5. The hot-melt adhesive resin film according to claim 1, wherein said first intermediate layer and said second intermediate layer are layers which are formed by coating and drying a solution including said resin which is obtained by modifying a copolymer of propylene and 1-butene with maleic acid, and which have a film thickness after drying of 1 μm to 5 μm.

6. The hot-melt adhesive resin film according to claim 1, wherein said substrate layer comprises an inorganic filler.

7. A method of producing the hot-melt adhesive resin film of claim 1, the method comprising the steps of:
    coating a solution comprising the resin which has been obtained by modifying a copolymer of propylene and 1-butene with maleic acid on a first surface and an opposite second surface of said substrate layer to form a coated film;
    drying said coated film to form said first intermediate layer and said second intermediate layer;
    forming said first surface layer and said second surface layer by melt flow casting of the composition having an acid-modified polyolefin resin (A); and
    sticking said first surface layer to said first intermediate layer and said second surface layer to said second intermediate layer.

* * * * *